Oct. 18, 1960 M. N. WEBER 2,956,761
SELF-LEVELLING AND WEIGHING DEVICE
Filed Sept. 12, 1957 2 Sheets-Sheet 2
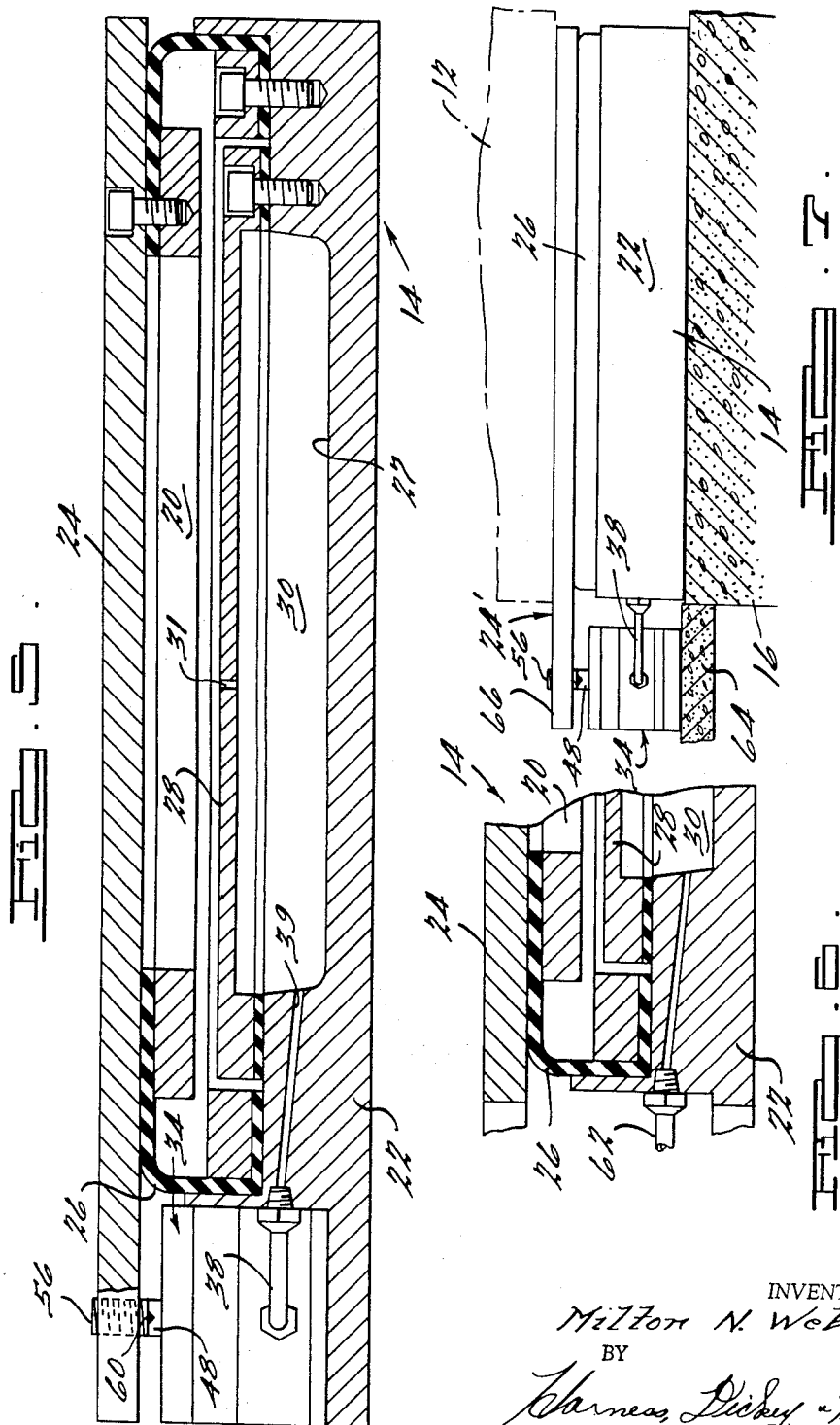
INVENTOR.
Milton N. Weber.
BY
Harness, Dickey & Pierce
ATTORNEYS.

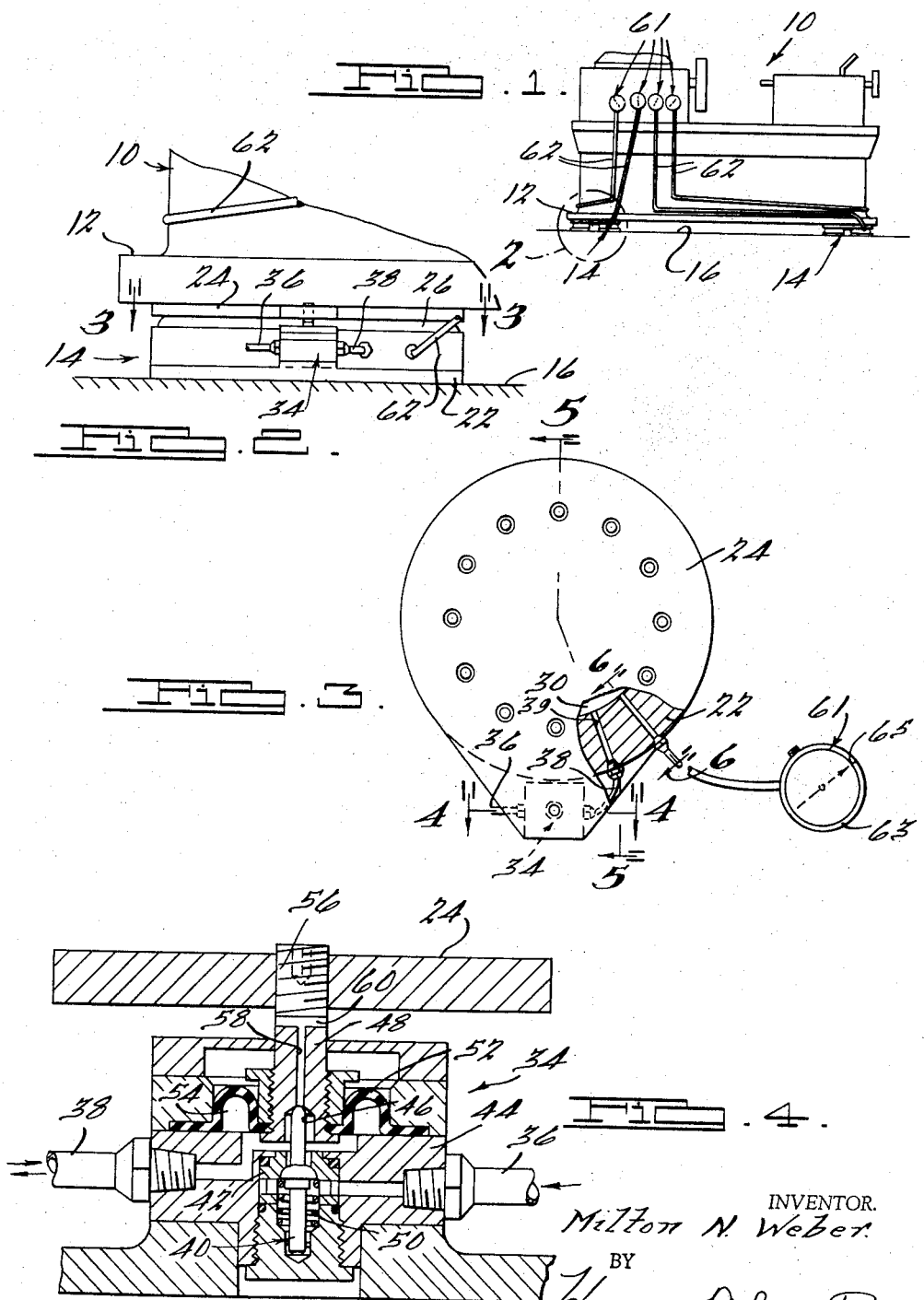

United States Patent Office 2,956,761
Patented Oct. 18, 1960

2,956,761

SELF-LEVELLING AND WEIGHING DEVICE

Milton N. Weber, Detroit, Mich., assignor to Weber Instrument Company, Detroit, Mich., a corporation of Michigan Filed Sept. 12, 1957, Ser. No. 683,547

7 Claims. (Cl. 248—22)

This invention relates to an improved self-levelling and vibration absorbing device, and more particularly to an improved self-levelling and vibration absorbing mount for machines and the like.

In Weber Patent No. 2,613,925, issued October 14, 1952, and assigned to the assignee of the present invention, a load sensitive fluid responsive device is illustrated employed for accurately weighing a load. The device includes a valve mechanism having fluid inlet and outlet conduits connected thereto, the valve mechanism being controlled in such manner that the application of a load to the device changes the position of a movable element thereof in a manner to cause a compensating change of fluid pressure, greater or smaller, as the case may be, in the outlet conduit.

In the present arrangement a fluid pressure responsive device is used for supporting a load such as a machine or the like, and a control, or pilot valve is arranged to increase and decrease the fluid pressure in the device in response to relatively minute changes in the position of the load, and thus to keep the load at a predetermined fixed position regardless of how it varies. Improved results are obtained, particularly with regard to absorbing load vibrations and reducing the natural frequency of the assembly, by damping the response of the fluid pressure device to the action of the pilot valve. Accordingly, in the present arrangement a damping device is included to slow down the response of the fluid pressure device to the action of the pilot valve, thereby permitting the fluid to absorb load vibrations and allowing the load position to vary momentarily about a predetermined average position which is controlled by the pilot valve.

Accordingly, the main objects of the invention are: to provide an improved self-levelling and vibration absorbing mount for heavy machines and other loads; to provide an improved self-levelling and vibration absorbing mount for supporting a load at a predetermined average position while permitting the load to vary momentarily in position, thereby absorbing load vibrations while simultaneously keeping the load at a fixed average position; to provide an improved self-levelling and vibration absorbing mount for supporting a load including a fluid pressure responsive device, a pilot valve arranged to increase and decrease the fluid pressure in the device in response to changes in the position of the load, and damping means for damping the response of the fluid pressure device to the action of the pilot valve; and in general to provide an improved vibration absorbing and self-levelling mount for a machine or other load which is simple in construction, positive in operation and economical to manufacture.

Other objects and features of novelty of the invention will be specifically pointed out or will become apparent when referring, for a better understanding of the invention, to the following description taken in conjunction with the accompanying drawing, wherein:

Figure 1 is an elevational view of a machine supported upon a plurality of improved mounts according to the present invention;

Fig. 2 is an enlarged elevational view of the portion of the machine shown in Fig. 1 included within the circle 2 thereof, showing in somewhat greater detail one of the improved mounts according to one embodiment of the invention;

Fig. 3 is a plan view partly in section of the mount shown in Fig. 2, being taken generally along the line 3—3 thereof;

Fig. 4 is a fragmentary, cross-sectional view of the mount as shown in Fig. 3, taken generally along the section line 4—4 thereof, and particularly showing the construction of the pilot valve;

Fig. 5 is a cross-sectional view of the mount as shown in Fig. 3, being taken generally along the section line 5—5 thereof;

Fig. 6 is a fragmentary, cross-sectional view of the mount as shown in Fig. 3, being taken generally along the section line 6—6 thereof; and Fig. 7 is an elevational view of a mount according to a second embodiment of the invention, particularly illustrating an arrangement for use where the load, or machine supported by the mount is to be kept level regardless of variations in the height of the base support beneath the mount.

Referring now to the drawings, a machine 10 or other load is shown therein, including a frame 12 upon which the operative parts of the machine are mounted and which is supported upon a plurality of mounts 14 according to the present invention. The mounts 14 are interposed between the frame 12 and the floor, or other base support 16, and need not be attached thereto, although provision for attaching the mounts to the machine or to the floor may be made if desired.

Each one of the mounts 14 includes a main load-supporting chamber 20 defined by a base, or body 22, an upper plate, or platform 24, and a flexible diaphragm 26 connected between and sealed to the body 22 and the platform 24. The machine frame 12 rests on the platform 24, which is resiliently supported above the body 22 by the fluid pressure within the chamber 20. The diaphragm 26 is flexible so that changes in loading of the machine 10 or in the fluid pressure within the chamber 20 will cause the platform 24 to move vertically.

As best shown in Fig. 5, the base 22 is formed of a heavy metal plate or casting, and is provided with a cup-like depression 27, over which a plate 28 is sealed to define a reservoir 30. This plate 28 forms the major portion of the floor of the main chamber 20, which is substantially fully enclosed except for a relatively narrow passageway, or restrictor 31 extending through the plate 28 and connecting the main chamber 20 with the reservoir 30. The entire flow of fluid into and out of the chamber 20 (except for negligible leakage) passes through the restrictor 31 and the reservoir 30, which function to damp the fluid flow.

The fluid pressure in the reservoir 30 is controlled by a position responsive pilot valve 34 (Fig. 4) which is of somewhat similar construction to the corresponding valve of the above-mentioned patent, and which includes an inlet conduit 36 and an outlet conduit 38. The inlet conduit 36 is connected to a source (not shown) of pressurized fluid such as compressed air, and the outlet conduit 38 communicates directly with the reservoir 30 through a passageway 39 formed in the body 22. The flow of fluid through the valve 34 is controlled by a valve stem 40, which engages a downwardly facing fixed valve seat 42 in the valve body 44, and also extends upwardly, centrally through the valve seat 42 to engage a downwardly facing seat 46 in a plunger 48. The valve stem 40 is urged upwardly against the valve seat 42 by a biasing spring 50 to close off the inlet conduit 36. The fluid pressure on the inlet side of the valve stem 40 is normally greater than the pressure on the outlet side, and also acts to urge the valve stem upwardly.

The plunger 48 is vertically movable with respect to the valve body 44, but is sealed thereto by a diaphragm 52, forming an outlet chamber 54 with which the outlet conduit 38 communicates. The plunger 48 is urged upwardly by the pressurized fluid within the outlet chamber 54 into abutting engagement with a level adjustment screw 56 carried by the platform 22 of the mount. When the weight of the load upon the platform 22 increases, momentarily compressing the fluid within the chamber 20, it depresses the platform 24, and, through the screw 56, drives the plunger 48 downwardly. The plunger 48 in turn drives the valve stem 40 downwardly, opening the valve at the seat 42 and admitting fluid from the inlet conduit 36 into the outlet chamber 54. The fluid flows from the chamber 54 through the outlet conduit 38, into the reservoir 30, and then through the restrictor 31 into the chamber 20 until the platform 24 is restored to its initial height, at which time the valve stem 40 again seats against the valve seat 42, closing the valve. The pressure of the air will provide a reading on a calibrated gauge to accurately give the weight of a load resting upon the platform 24.

The plunger 48 is axially bored to provide an exhaust passageway 58 for exhausting fluid when the load on the platform decreases. When the valve is in its equilibrium position, as illustrated in Fig. 4, this passageway 58 is closed at its lower end by the top of the valve stem 40. At its upper end, the passageway 58 opens within a transverse notch 60 formed in the top of the plunger 48, which notch permits free escape of exhaust fluid between the plunger and the adjustment screw 56.

When the load on the platform 24 decreases momentarily, the pressurized fluid within the chamber 20 raises the platform 24 above its normal position, and the plunger 48, being urged upwardly by the fluid pressure in the outlet chamber 54, is also raised, thus disengaging the plunger 48 from the valve stem 40 and opening the exhaust passageway 58 to permit compressed fluid to escape.

Thus, regardless of the load imposed upon the mount 14, as long as the load does not substantially exceed the limit of the device as determined by the size of the chamber 20 and the available fluid pressure supply, the platform 24 is maintained at a substantially constant average height above the body 22 and the exact weight of the load can be indicated. It will be appreciated that extremely minute movements of the platform 24 are sufficient to actuate the pilot valve 34 and that the average height of the platform may be controlled and a weight reading obtained with a high degree of precision.

When initially setting up the machine 10, the mounts 14 are individually set by adjusting the adjustment screws 56 to bring the machine into a desired level position. A fluid pressure gauge 61 is connected, as shown, to the reservoir 30 through a conduit 62 for indicating the fluid pressure therein. This gauge 61 may be calibrated to read directly in units of weight, if desired, for indicating the total load supported by the mount. Changes in the relative readings of the gauges connected to different ones of the mounts will then indicate changes in load distribution or changes in the level of the floor, or base support 16, and thus facilitate readjustment of the screws 56 to keep the machine level at all times. Preferably, the gauge 61 is mounted at a convenient location for observation by the machine operator, all of the gauges for the different ones of the mounts being placed at a single, central location as shown in Fig. 1. Also, the gauges are preferably provided with rotatable rims 63 marked with an index line 65. When the mounts 14 are first installed, the machine 10 is levelled by setting the adjustment screws 56. The movable parts of the machine are then brought to an index position, and the gauge rims 63 are set to align the index lines 65 with the pointers. The level of the machine and the operation of the mounts may then be checked at any future time by again bringing the movable parts of the machine to their index positions, at which time the gauge pointers will all again align themselves with the index lines 65. If the gauge pointers do not come into alignment with the index lines 65 a malfunction or uneven subsidence of the floor or base support 16 is indicated.

As illustrated in Figs. 1–6, the pilot valve 34 is mounted between the platform 24 and the body 22, and is thus effective to maintain the height of the platform 24 substantially constant with respect to the body 22. This arrangement is relatively compact and provides a unitary mount. If, however, the machine 10 is subject to extreme vibration or is exceptionally heavy so that the floor, or other base support 16 may be expected to sink, the valve 34 may be separated from the body 22, and mounted upon a fixed support, preferably one that is lightly loaded and independent of the base support 16.

Such an arrangement is shown illustratively in Fig. 7, wherein the pilot valve 34 is shown supported on a lightly loaded floor 64 apart from the body 22, which rests on a separate base support 16. The platform 24', according to this embodiment of the invention, is provided with an extension 66 which carries a level adjustment screw 56 positioned over the valve 34 for actuating it. It will be appreciated that this arrangement may be varied considerably, and that the location of the pilot valve 34 may be varied within wide limits. If desired, the pilot valve 34 may be actuated directly by a portion of the machine itself, or by a separate member (not shown) fixed to the machine and spaced from the platform 24.

It will be seen that with this arrangement the mount 14 is made self-levelling and operates to compensate automatically not only for changes in the load imposed upon the mount, but also for any changes in the height of the base support 16.

The size of the reservoir 30 and of the restrictor 31 are selected in view of the size of the mount and the weight of the load. In a typical practical embodiment the mount 14 may have an effective lifting area of about 70 square inches and be operated with fluid pressures in the range of about 40 to 50 pounds per square inch, to support a load of about 3,000 pounds. For a mount of this size and capacity, optimum damping is achieved using a reservoir of about 40 cubic inches in volume, and a restrictor 31 equivalent to a .030" diameter round hole.

The reaction characteristic of the mount may be varied within a wide range by appropriately changing the sizes of the reservoir and of the restrictor aperture, as will be evident in the light of the foregoing description. Enlarging the reservoir, or decreasing the size of the restrictor tends to slow down the response of the mount to changes in load. Conversely, decreasing the size of the reservoir, or enlarging the restrictor tends to speed up the response.

In operation, vibration of the load is absorbed by the compressible fluid within the chamber 20, which permits the load position to vary momentarily from its pre-set height. Any semi-permanent change in the load, however, such as may be occasioned by placing a workpiece on the machine 10, or by moving one of the machine's movable members is compensated for by the action of the pilot valve 34, which effects a change in the average fluid pressure in the reservoir 30 in response to such load changes. The average fluid pressure in the reservoir 30 is transmitted to the main supporting chamber 20 through the restrictor 31 and is thus effective to control the average, or mean height about which the load is permitted to vibrate. Thus, vibratory movement of the load is cushioned and absorbed by the fluid, and is not transmitted to the base support 16. Relatively low frequency changes in the load are compensated for by changes in the quantity of fluid in the chamber 20, as controlled by the pilot valve 34 through the damping arrangement, so that the average height of the load, that is, the level about which it is permitted to vibrate, is maintained constant within very close limits.

It will be noted that one or more of the devices can successfully weigh the machine, an article or a device having a load to be weighed contained therein or thereon. It is only necessary to calibrate the gauge or gauges 61 to have the mounts or weighing devices 14 provide a reading for the load disposed on the platform or platforms 24. Thus, the sum of the readings of the four calibrated gauges 61 of Fig. 1 will give an accurate weight of the machine.

What is claimed is:

1. In a load supporting and weighing device, a base member, a platform above said base member, sealing means between said platform and base member forming a chamber for air, and a valve for admitting air into said chamber or conducting air therefrom to maintain said platform at a predetermined height, said valve comprising a valve body having an outlet chamber therein, means communicating said outlet chamber with said chamber, flexible diaphragm means forming a portion of one wall of said outlet chamber, plunger means slidably mounted in said valve body and connected to said diaphragm means so as to be normally urged upwardly into abutting engagement with a portion of said platform by the pressurized air within said outlet chamber and valve means in said valve body operated by said plunger means for controlling the flow of pressurized air into and out of said outlet chamber.

2. In a load supporting and weighing device, a base member, a platform above said base member, sealing means between said platform and base member forming a chamber for air, and a valve for admitting air into said chamber or conducting air therefrom to maintain said platform at a predetermined height, said valve comprising a valve body having an outlet chamber therein, means communicating said outlet chamber with said chamber, flexible diaphragm means forming a portion of one wall of said outlet chamber, plunger means slidably mounted in said valve body and connected to said diaphragm means so as to be normally urged upwardly into abutting engagement with a portion of said platform by the pressurized air within said outlet chamber, valve means in said valve body operated by said plunger means for controlling the flow of pressurized air into and out of said outlet chamber, and indicating means responsive to the pressure of the air within the chambers for providing visible indication of the weight of the load.

3. In a load supporting and weighing device, a base having a pair of chambers thereon in communication with each other through a metering aperture, a floating platform mounted on said chambers which supports a load on the air provided therein, and a valve associated with one chamber responsive to a change in the spacing of the platform and base for controlling the flow of air to and from the chambers for maintaining the platform spaced a predetermined distance from the base, said valve comprising a valve body having an outlet chamber therein, means communicating said outlet chamber with said one chamber, flexible diaphragm means forming a portion of one wall of said outlet chamber, plunger means slidably mounted in said valve body and connected to said diaphragm so as to be normally urged upwardly into abutting engagement with a portion of said platform by the pressurized air within said outlet chamber, and valve means in said valve body operated by said plunger means for controlling the flow of pressurized air into and out of said outlet chamber.

4. In a load supporting and weighing device, a base having a pair of chambers thereon in communication with each other through a metering aperture, a floating platform mounted on said chambers which supports a load on the air provided therein, and a valve associated with one chamber responsive to a change in the spacing of a platform and base for controlling the flow of air to and from the chambers for maintaining the platform spaced a predetermined distance from the base, said valve comprising a valve body having an outlet chamber therein, means communicating said outlet chamber to said one chamber, flexible diaphragm means forming a portion of one wall of said outlet chamber, plunger means slidably mounted in said valve body and connected to said diaphragm means so as to be normally urged upwardly into abutting engagement with a portion of said platform by the pressurized air within said outlet chamber, valve means in said valve body operated by said plunger means for controlling the flow of pressurized air into and out of said outlet chamber, and weight indicating means responsive to the pressure of the air within the chambers for providing visible indication of the weight of the load.

5. In a load supporting and weighing device, a base member having a reservoir containing an intake passage for air and a metering aperture, a platform, a flexible element sealing said platform to said base member to form a chamber in communication with said metering aperture, and a valve for admitting air into said reservoir or conducting air therefrom to maintain said platform at a predetermined height, said valve means comprising a valve body having an outlet chamber therein, conduit means communicating said outlet chamber with said intake passage, flexible diaphragm means forming a portion of one wall of said outlet chamber, plunger means slidably mounted in said valve body and connected to said diaphragm means so as to be normally urged upwardly into abutting engagement with a portion of said platform by the pressurized air within said outlet chamber, and valve means in said valve body operated by said plunger means for controlling the flow of pressurized air into and out of said outlet chamber.

6. The invention as defined in claim 5 including adjustable means for varying the point at which said plunger means abuts against said portion of the platform whereby the predetermined height at which said platform is maintained can be varied.

7. In a load supporting and weighing device, a base member, a platform above said base member, sealing means between said platform and base member forming a chamber for air, and a valve for admitting air into said chamber or conducting air therefrom to maintain said platform at a predetermined height, said valve comprising a body having a variable volume outlet chamber therein, means communicating said outlet chamber with said chamber, plunger means slidably mounted in said body and normally urged upwardly into abutting engagement with a portion of said platform by the pressurized air within said outlet chamber, and valve means in said valve body operated by said plunger means for controlling the flow of pressurized air into and out of said outlet chamber.

References Cited in the file of this patent

UNITED STATES PATENTS

| | | |
|---|---|---|
| 604,082 | Richards | May 17, 1898 |
| 1,141,360 | Rudd | June 1, 1915 |
| 2,365,994 | Ashton | Dec. 26, 1944 |
| 2,479,422 | Shook | Aug. 16, 1949 |
| 2,706,607 | Withers et al. | Apr. 19, 1955 |